United States Patent
Kenoyer et al.

(10) Patent No.: US 9,197,852 B2
(45) Date of Patent: Nov. 24, 2015

(54) SYSTEM AND METHOD FOR POINT TO POINT INTEGRATION OF PERSONAL COMPUTERS WITH VIDEOCONFERENCING SYSTEMS

(75) Inventors: Michael Kenoyer, Austin, TX (US); Michael Horowitz, Austin, TX (US)

(73) Assignee: Polycom, Inc., San Jose, CA (US)

( * ) Notice: Subject to any disclaimer, the term of this patent is extended or adjusted under 35 U.S.C. 154(b) by 2772 days.

(21) Appl. No.: 11/101,317

(22) Filed: Apr. 7, 2005

(65) Prior Publication Data

US 2005/0198134 A1 Sep. 8, 2005

Related U.S. Application Data

(63) Continuation of application No. 10/162,175, filed on Jun. 3, 2002, now Pat. No. 6,941,343.

(60) Provisional application No. 60/295,383, filed on Jun. 2, 2001.

(51) Int. Cl.
*G06F 15/16* (2006.01)
*H04N 7/14* (2006.01)
*G09B 5/06* (2006.01)
*H04N 7/15* (2006.01)

(52) U.S. Cl.
CPC .................. *H04N 7/148* (2013.01); *G09B 5/06* (2013.01); *H04N 7/147* (2013.01); *H04N 7/15* (2013.01)

(58) Field of Classification Search
USPC ................................ 709/206, 204; 348/14.01
See application file for complete search history.

(56) References Cited

U.S. PATENT DOCUMENTS

| | | | | |
|---|---|---|---|---|
| 4,710,917 A | * | 12/1987 | Tompkins et al. | 709/204 |
| 5,434,913 A | * | 7/1995 | Tung et al. | 379/202.01 |
| 5,491,780 A | | 2/1996 | Fyles et al. | 395/153 |
| 5,519,851 A | | 5/1996 | Bender et al. | 395/500 |
| 5,539,658 A | | 7/1996 | McCullough | 364/514 A |
| 5,594,725 A | | 1/1997 | Tischler et al. | 370/260 |
| 5,674,003 A | * | 10/1997 | Andersen et al. | 709/228 |
| 5,737,537 A | | 4/1998 | Gardos et al. | 395/200.77 |
| 5,774,206 A | | 6/1998 | Wasserman et al. | 395/200.77 |
| 5,812,787 A | | 9/1998 | Astle | 395/200.77 |
| 5,864,366 A | | 1/1999 | Yeo | 348/409 |
| 5,889,945 A | | 3/1999 | Porter et al. | 395/200.34 |
| 5,946,042 A | * | 8/1999 | Kato | 375/240.15 |
| 5,999,966 A | | 12/1999 | McDougall et al. | 709/204 |

(Continued)

FOREIGN PATENT DOCUMENTS

| | | | | |
|---|---|---|---|---|
| EP | 0 753 968 | 1/1997 | | H04N 7/24 |
| EP | 0 763 944 | 3/1997 | | H04N 7/50 |

(Continued)

OTHER PUBLICATIONS

Neelie R. Prasad, "*IEEE 802.11 System Design*," Jul. 2000, IEEE, pp. 490-494.

*Primary Examiner* — Shripal Khajuria
(74) *Attorney, Agent, or Firm* — Blank Rome LLP

(57) ABSTRACT

A system and method for integrating a personal computer based presentation with a videoconferencing system. A coupling device includes a card, insertable into a PCMCIA slot of a laptop computer or like machine, which includes a cable coupled to the card at a first end and to a connector coupled at a second end. The card includes firmware for loading into RAM of the computer and software operable to execute code.

6 Claims, 5 Drawing Sheets

(56) References Cited

U.S. PATENT DOCUMENTS

| | | | |
|---|---|---|---|
| 6,088,730 A | 7/2000 | Kato et al. | 709/227 |
| 6,144,991 A | 11/2000 | England | 709/205 |
| 6,151,621 A | 11/2000 | Colyer et al. | 709/204 |
| 6,237,026 B1 * | 5/2001 | Prasad et al. | 709/204 |
| 6,295,551 B1 | 9/2001 | Roberts et al. | 709/205 |
| 6,300,972 B1 | 10/2001 | Yamamoto | 348/14.08 |
| 6,505,234 B1 | 1/2003 | Riddle | 709/204 |
| 6,512,515 B1 | 1/2003 | Smith et al. | 345/419 |
| 6,532,218 B1 * | 3/2003 | Shaffer et al. | 370/260 |
| 6,570,606 B1 * | 5/2003 | Sidhu et al. | 348/14.1 |
| 6,615,239 B1 | 9/2003 | Berstis | 709/204 |
| 6,625,258 B1 * | 9/2003 | Ram et al. | 379/88.13 |
| 6,640,241 B1 | 10/2003 | Ozzie et al. | 709/204 |
| 6,654,032 B1 | 11/2003 | Zhu et al. | 345/753 |
| 6,665,741 B1 | 12/2003 | Bronson | 710/8 |
| 6,675,387 B1 | 1/2004 | Boucher et al. | 725/105 |
| 6,691,154 B1 | 2/2004 | Zhu et al. | 709/204 |
| 6,760,749 B1 * | 7/2004 | Dunlap et al. | 709/204 |
| 2003/0231600 A1 * | 12/2003 | Polomski | 370/263 |

FOREIGN PATENT DOCUMENTS

| | | | |
|---|---|---|---|
| EP | 0 763 948 | 3/1997 | H04N 9/804 |
| EP | 0 828 392 | 3/1998 | H04N 7/26 |
| EP | 0 849 952 | 6/1998 | H04N 7/32 |
| EP | 0 851 685 | 7/1998 | H04N 7/50 |
| EP | 0 868 086 | 9/1998 | H04N 7/50 |
| EP | 0 902 593 | 3/1999 | H04N 7/50 |
| EP | 0 940 989 | 9/1999 | H04N 7/24 |

* cited by examiner

SYSTEM AND METHOD FOR POINT TO POINT INTEGRATION OF PERSONAL COMPUTERS WITH VIDEOCONFERENCING SYSTEMS

CROSS-REFERENCE TO RELATED APPLICATIONS

This application is continuation of U.S. patent application Ser. No. 10/162,175 filed Jun. 3, 2002 now U.S. Pat. No. 6,941,343 and entitled "System and Method for Point to Point Integration of Personal Computers with Videoconferencing Systems" which claims the benefit of U.S. Provisional Patent Application No. 60/295,383, filed on Jun. 2, 2001, entitled "Point to Point Integration of Personal Computers with Videoconferencing Systems."

BACKGROUND OF THE INVENTION

1. Field of the Invention

The invention relates generally to videoconferencing and more particularly to point to point integration of computers and videoconferencing systems.

2. Description of the Related Art

Audio, video, and data conferencing systems are increasingly popular and valuable business communications tools. Videoconferencing systems are utilized to facilitate natural communication between persons or groups of persons situated remotely from each other, thus streamlining the communication and decision-making process and obviating the need for expensive and time-consuming business travel.

The prevalence of laptop computers and presentation software has enabled information to be portable from one location to another. Thus, for example, a salesperson having a laptop computer making a sales call upon a business can easily make a presentation from his laptop computer to interested viewers at the sales call location. However, in order to make the presentation at remote locations of the business, the salesperson has been required to interface the laptop computer into the videoconferencing system of the business.

Conventional videoconferencing systems provide for a personal computer to be coupled through its VGA port to the videoconferencing system. Such systems disadvantageously limit the personal computer operators presentation of images to screen shots of the desktop. Furthermore, the video signal provided the personal computer must be digitized by the videoconferencing system.

Conventional software solutions to this problem provide functionality for sharing files between a personal computer and a Videoconferencing Systems. The software must be loaded onto the personal computer from which it is desired to share files. A conventional file sharing system includes scan conversion of a digital image file resident on personal computer coupled to a videoconferencing system. Scan conversion includes converting a digital image in the personal computer to an S video source file which is output from the personal computer's VGA port and input through an S video connector to the videoconferencing system. Scan conversion converts the digital image file to an analog signal that is then re-digitized by the videoconferencing system. Disadvantageously, scan conversion introduces noise.

What is needed therefore are a system and method for providing point-to-point integration of personal computers with videoconferencing systems that overcome deficiencies of the prior art.

SUMMARY OF THE INVENTION

In an exemplary embodiment of the invention, a coupling device includes a card insertable into a PCMCIA slot of a laptop computer or like machine. The coupling device further includes a cable coupled to the card at a first end and to a connector at a second end. The card includes firmware to be loaded into RAM of a laptop computer and software operable to execute code including an ITU H.261 Annex D like algorithm. The Annex D-like algorithm provides the capability of motion simulation to track changes in the transmitted image file. The software also enables dual stream communication between a laptop computer and a videoconferencing system.

In another embodiment of the invention, personal computer software includes code operable to provide dual stream communication and to execute the Annex D-like algorithm. In another embodiment of the invention, personal computer software is operable in a client/server architecture wherein the personal computer is the client and the videoconferencing system is the server.

BRIEF DESCRIPTION OF THE DRAWINGS

The foregoing and other advantages of the invention will be appreciated more fully from the following description thereof and with reference to the accompanying drawings, wherein.

DETAILED DESCRIPTION OF THE PREFERRED EMBODIMENTS

Dual stream communication provides for integration of a coupled personal computer or a laptop computer with an existing videoconferencing system. The systems and methods of the present invention find particular applicability in the context of the ViewStation™, a videoconferencing system manufactured by Polycom, Inc. of Milpitas, Calif. As further described below, dual stream communication enables control signals from the videoconferencing system to control applications on an integrated personal computer.

Figure 1:
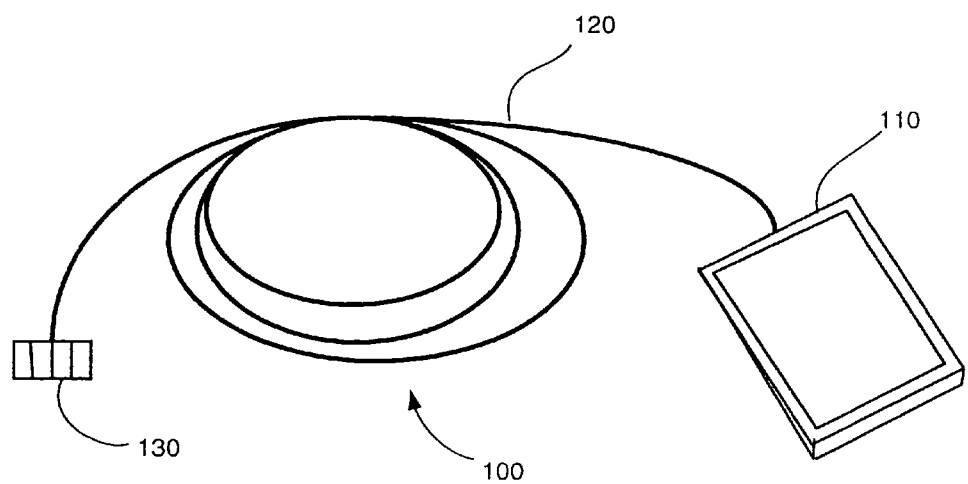
FIG. 1 illustrates a coupling device according to the invention.

FIG. 1 shows a coupling device 100 including a card 110 for insertion into the PCMCIA slot of a laptop computer (not shown). Card 110 includes firmware for launching software which is written into RAM of the laptop computer and executes as described below. Card 110 is coupled to an RJ-9 connector 130, in an exemplary embodiment, by a cable 120. RJ-9 connector 130 is preferably coupled to an available port of a microphone pod (not shown) that is in turn coupled to a videoconferencing system (not shown). Such coupling provides a signal path between the integrated laptop computer and the videoconferencing system.

Figure 2:
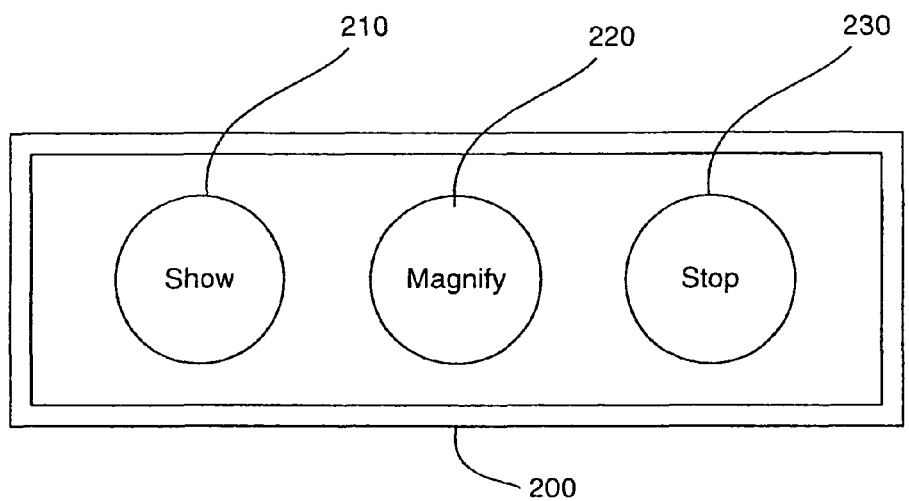
FIG. 2 illustrates an interface according to the invention.

Referring to FIG. 2, installing card 110 into the integrated laptop computer and launching an application provided by card 110 displays an interface 200 on a screen of the laptop computer. Interface 200 includes a plurality of buttons including a Show PC button 210, a Magnify button 220, and a Stop button 230.

By selecting interface 200, by for example with a mouse or similar user input device clicking on the interface 200, a user is enabled to give a presentation loaded in the videoconferencing system such as a PowerPoint® presentation. Clicking on Show PC button 210 will send a presentation loaded into a laptop or personal computer from the videoconferencing System to a remote site. A play symbol (not shown) or other play indicator may change color to indicate that the presentation is being transmitted to the videoconferencing system. If no presentation is loaded in the videoconferencing system, code executing on the laptop sends an image of the laptop computer desktop. If a PowerPoint® presentation is loaded into the videoconferencing system, a dialogue appears to allow the presenter to select between a Visual Concert PC presentation and the PowerPoint® presentation. In order to select the presentation to be displayed, a presenter highlights a desired presentation and selects the desired presentation by clicking with a mouse or similar user input device. At this point, the presentation begins transmitting and a confirming indicator can appear. A presenter can pause a presentation by clicking Show PC button 210 with the mouse or similar user input device. A pause symbol (not shown) or other pause indicator may change color to alert the presenter that the transmission from the laptop or the personal computer to the videoconferencing system has been paused. A click of Show PC button 210 can resume transmission. The presenter can end a presentation by clicking with the mouse (or similar user input device) on Stop button 230, which may change color to indicate that the transmission of the presentation has stopped.

Interface 200 allows a presenter to select to stream a compressed and scaled image from a computer screen to a videoconferencing system. The videoconferencing system displays the scaled image as a live graphic on a remote monitor. The live graphic image can be viewed locally and also remotely during a videoconference. The remote monitor shows a live view of the presenter and the computer screen at the same time. In this exemplary embodiment, connection bandwidth is dynamically shared between the graphic image and the presenter's video image. Therefore, when the computer screen is not changing, all of the bandwidth can be devoted to showing the live view of the presenter.

Interface 200 further provides a means for resizing/moving a magnify window. The invention allows the presenter to zoom in on an area of a computer screen to see a magnified view of the area. This can be achieved by clicking with the mouse on Magnify button 220, which may change color to indicate that the magnification feature is in effect. Once Magnify button 220 is active, a magnify window opens and can be moved similarly to the way an icon on a desktop of a computer is moved. Clicking and dragging with the mouse can move the magnify window. The magnified window appears on the presenter's computer and can be used to magnify any information desired on the computer screen. The magnified information is displayed full screen on the videoconferencing system. Returning to a non-magnified state requires another click on Magnify button 220.

A remote control (not shown) may be used to control the presentation of images and presentations from the integrated laptop computer. When a presentation is being transmitted, control buttons such as left/right/up/down arrows on the remote control can be used to go back, advance, go to the first slide or go to the last slide of a presentation, respectively. These arrows can also move the magnify window when in magnify mode. Other buttons such as select, near, zoom +/−, snapshot and slides can be represented on the remote control. These buttons can select the highlighted option, provide near camera source control, zoom in and out of an area on the presenter's personal computer or laptop screen, and start sending the display to the videoconferencing system, respectively. The remote control enables the presenter to control the presentation at a distance from the computer, thereby allowing freedom in the method of presentation.

In another embodiment of the invention, software is loaded into a personal computer or a laptop coupled to a LAN (not shown) having coupled thereto a videoconferencing system. The software provides functionality described earlier with respect to the exemplary embodiment. In this embodiment, the presenter's laptop or personal computer is connected to the videoconferencing system via a LAN. The software application is launched by a presenter and the videoconferencing system's IP address is entered. All other functions are the same as described earlier in connection with the exemplary embodiment.

Alternatively, another embodiment includes software loaded into a personal computer coupled directly to a videoconferencing system. In this embodiment the videoconferencing system acts as a DHCP server. The software provides functionality described with respect to the above-described exemplary embodiment.

H.261 is a commonly used protocol that specifies encoding and decoding of real-time video data to support video transmission applications. A typical application includes video conferencing where two or more endpoints are connected with a real-time video link. Video signals are digitized, compressed and transmitted over transmission media such as ISDN lines.

Annex D relates to the protocol for transmitting digital images within the H.261 protocol. Annex D provides a sub-sampling of image pixels to generate four Common Intermediate Format (CIF) 352×280 pixel sub-images that are each coded and transmitted serially to produce a 4CIF image.

Annex D advantageously provides for digital processing of image files and is particularly useful in the processing of static images. However, when motion is encountered in an image, as in the case where a cursor moves over text in the image, Annex D produces blurry and chopped images. This is due to the fact that Annex D recodes the entire image when motion is encountered and, depending upon the transmission data rate, a sufficient amount of information (bits) cannot be transmitted to account for the motion encountered.

Figure 3:
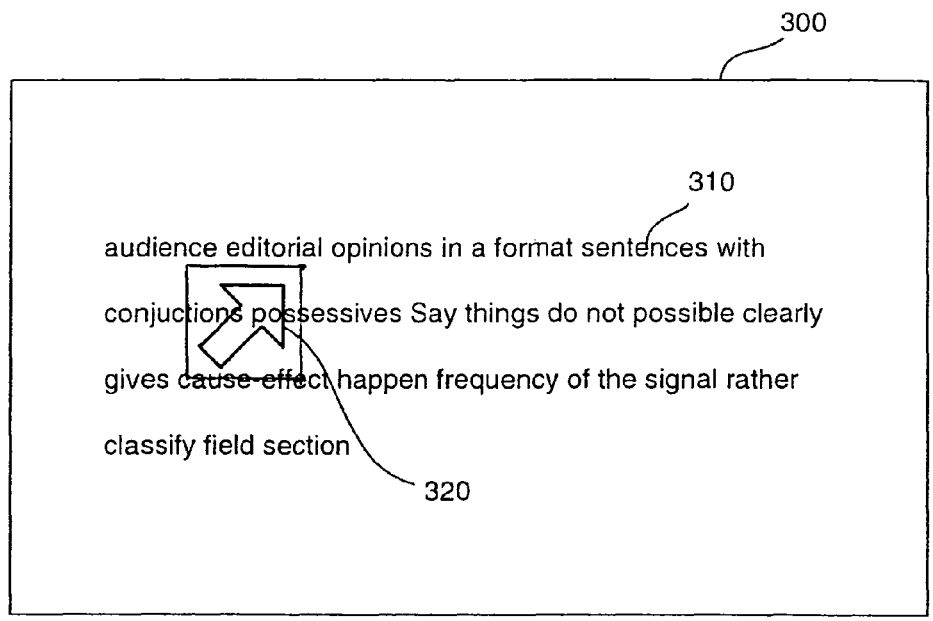
FIG. 3 illustrates an image.

As shown in FIG. 3, an illustrative image 300 includes text 310 and a cursor 320.

Figure 4:
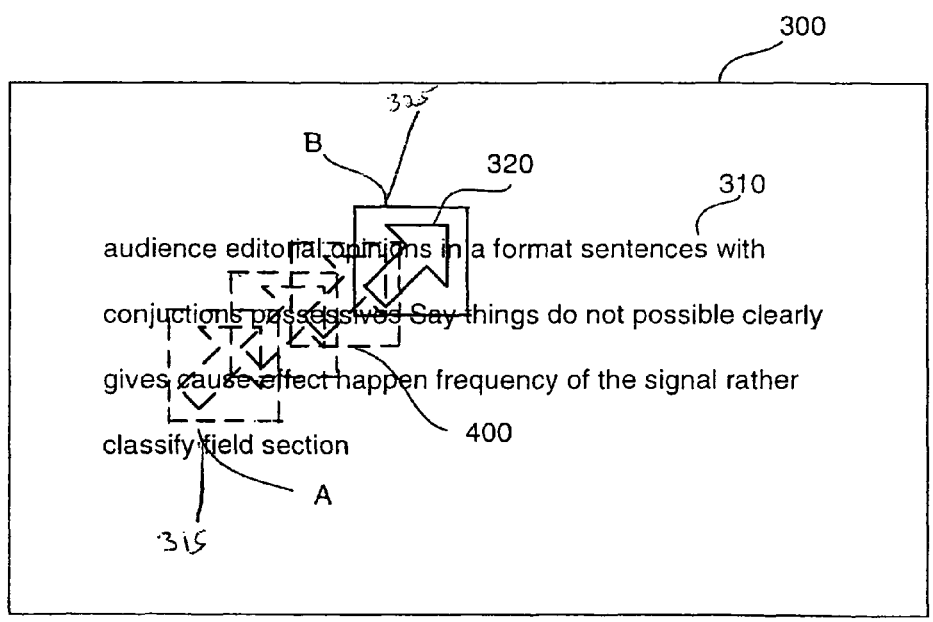
FIG. 4 illustrates the image of FIG. 3 showing movement of a cursor.

As shown in FIG. 4, movement of cursor 320 includes movement 400 from a position A 315 to a position B 325. In another embodiment of the invention, an Annex D-like algorithm processes of the cursor movement 400 so that cursor movement 400 is simulated for presentation by the videoconferencing system.

Figure 5:
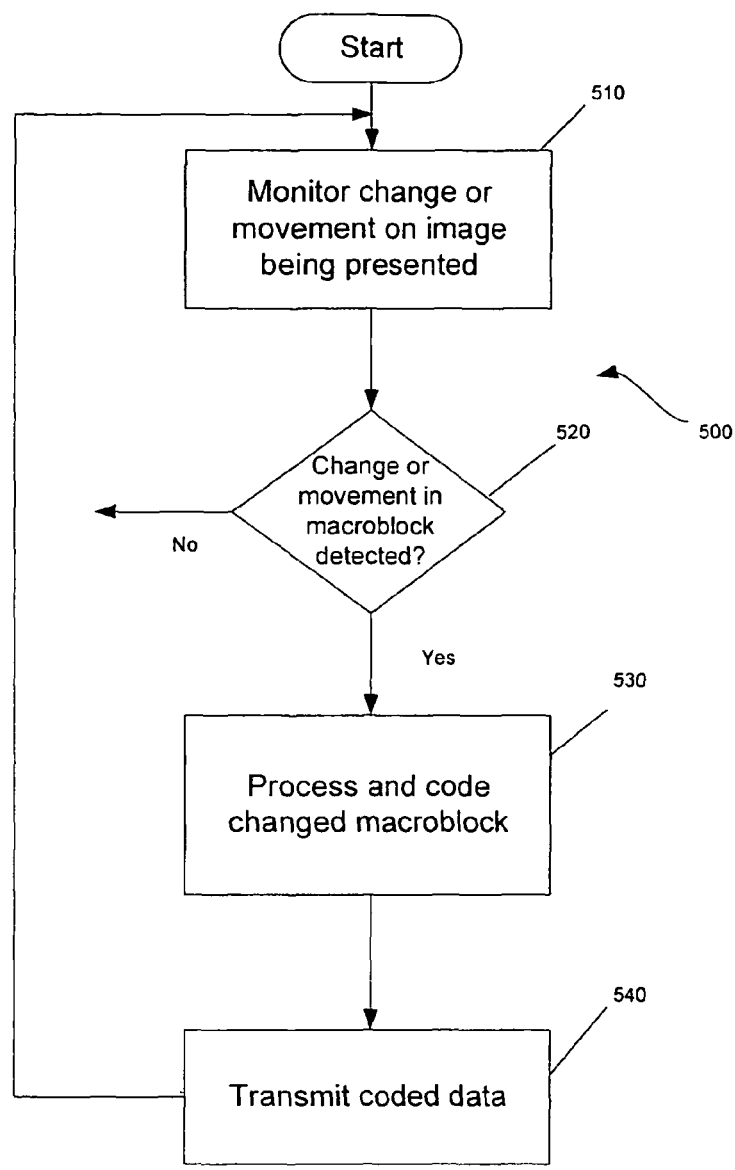
FIG. 5 is a flow diagram of a method according to the invention.

With reference to FIG. 5, a method 500 includes a step 510 in which an image being presented is monitored for changes or movement. More particularly, step 510 monitors changes in macroblocks.

If in a step 520 change or movement is detected in the macroblock, then in a step 530 pixels of the changed macroblock are locally processed, coded, and, in a step 540, transmitted. The local processing, coding and transmitting of step 540 include the Annex D sub-sampling localized to the changed macroblock.

If no change or movement is detected in step 520, then process 500 returns to step 510.

Finally, once the coded macroblock is transmitted in step 540, process 500 returns to step 510.

By processing changes to the image being presented on a macroblock-by-macroblock basis, method 500 concentrates required processing to the changed macroblock. Since the amount of information being processed is restricted to the changed macroblock, the quality of the transmitted information (i.e., number of bits transmitted) provides for simulated motion.

Figure 6:
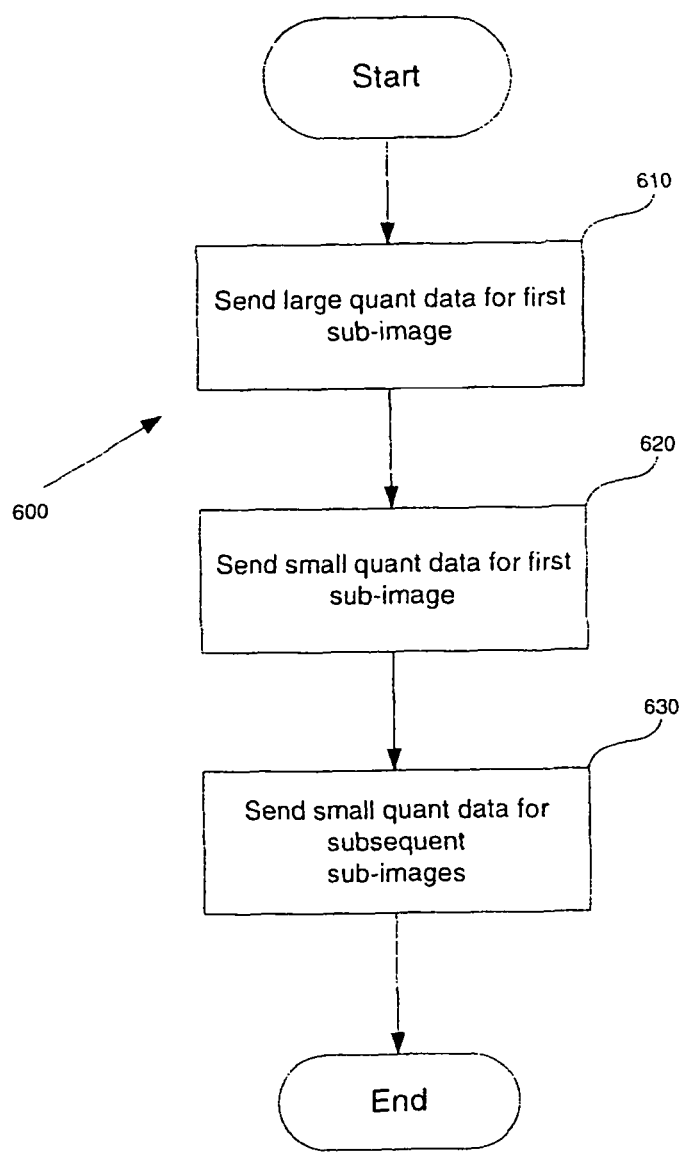
FIG. 6 is a flow diagram of another method according to the invention.

FIG. 6 illustrates an embodiment of a method 600 including a step 610 in which a first sub-image of the image being presented is coded and transmitted using a high quant. In step 620 the first sub-image is coded and transmitted using a low quant. In step 630 the subsequent sub-images are coded and transmitted using a low quant. In a preferred embodiment a quant of 6 is used in step 610, a quant of 1 is used in step 620, and a quant of 2 is used in step 630. By using the described quants the coarse image obtained from step 610 is sufficient to give the viewer a reasonable representation of what the image to be presented will be.

Method 600 advantageously provides for the very quick and inexpensive (e.g., in terms of processor cycles) transmission of a coarse representation of an image to be presented. Step 620 provides for increased granularity of the first sub-image while step 630 provides fine granularity subsequent sub-images.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

The invention claimed is:

1. An apparatus for conducting videoconferences, the apparatus comprising:
   a videoconferencing system at a local site configured to be coupled via a network connection to a remote videoconferencing system; and
   a personal computer coupled to the videoconferencing system via a local area network, wherein the personal computer executes software to cause the personal computer to stream a compressed and scaled image from the personal computer to the videoconferencing system for display as a live graphic on a remote monitor;
   wherein bandwidth of the network connection between the videoconferencing system and the remote videoconferencing system is dynamically shared between the compressed and scaled image from the personal computer and a video image of a participant at the local site.

2. The apparatus of claim 1 wherein the personal computer presents a presentation control user interface to a user for control of the compressed and scaled image transmitted to the videoconferencing system.

3. The apparatus of claim 1 wherein the compressed and scaled presentation image is displayed locally by the videoconferencing system.

4. An apparatus for conducting videoconferences, the apparatus comprising:
   a videoconferencing system at a local site configured to be coupled via a network connection to a remote videoconferencing system; and
   a personal computer coupled to the videoconferencing system via a local area network, wherein the personal computer executes software to cause the personal computer to stream a compressed and scaled image from the personal computer to the videoconferencing system for display as a live graphic on a remote monitor;
   wherein the videoconferencing system serves as a DHCP server to the personal computer over the local area network.

5. A method of integrating presentation content with a videoconference, the method comprising:
   executing, on a personal computer, software causing a compressed and scaled image from the personal computer to be transmitted to a videoconferencing system coupled to the personal computer via a local area network;
   receiving at the videoconferencing system the compressed and scaled image; and
   transmitting the compressed and scaled image from the videoconferencing system to a remote videoconferencing system via a network connection;
   whereby the compressed and scaled image can be displayed by the remote videoconferencing system;
   wherein transmitting the compressed and scaled image from the videoconferencing system to a remote videoconferencing system via a network connection further comprises dynamically sharing bandwidth between the compressed and scaled image and a video image of a local participant at the videoconferencing system.

6. The method of claim 5 further comprising executing, on the personal computer, software causing a presentation control user interface to be displayed to a user.

* * * * *